C. J. DORRANCE.
TROLLEY HARP CARRIER.
APPLICATION FILED APR. 21, 1920.
1,394,507.
Patented Oct. 18, 1921.
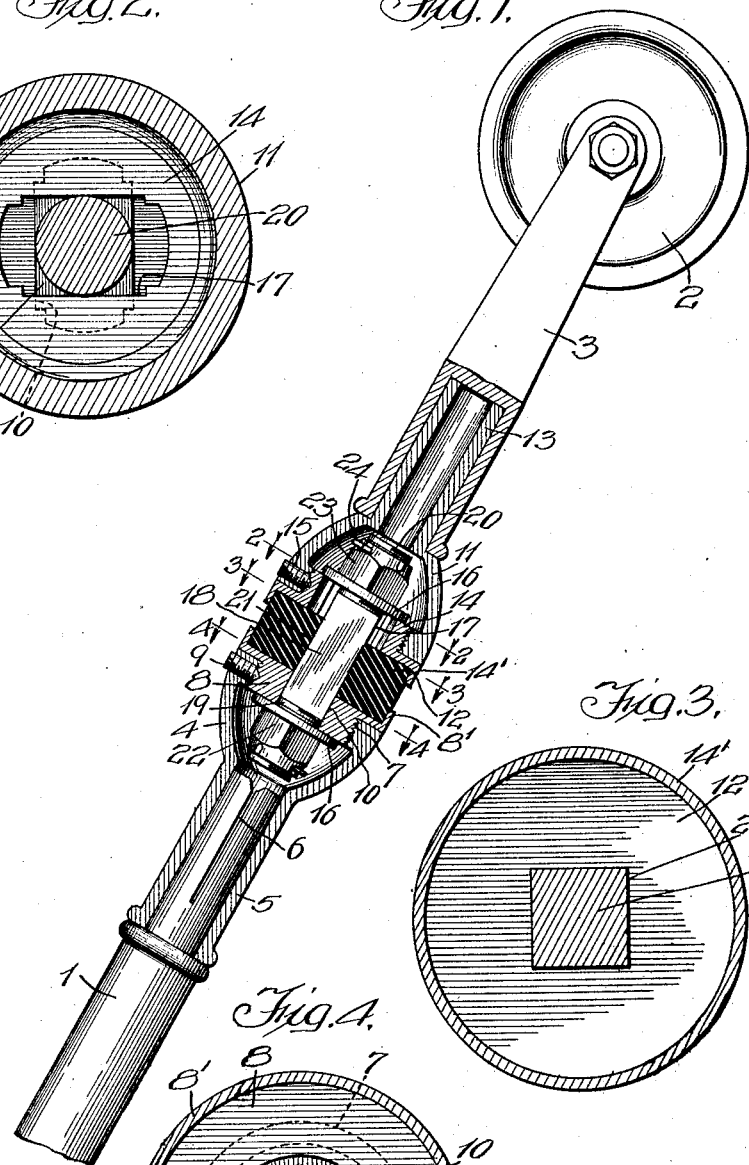

UNITED STATES PATENT OFFICE.

CHARLES J. DORRANCE, OF CHICAGO, ILLINOIS.

TROLLEY-HARP CARRIER.

1,394,507.   Specification of Letters Patent.   Patented Oct. 18, 1921.

Application filed April 21, 1920. Serial No. 375,541.

*To all whom it may concern:*

Be it known that I, CHARLES J. DORRANCE, a citizen of the United States, residing at Chicago, in the county of Cook and State of Illinois, have invented certain new and useful Improvements in Trolley-Harp Carriers, of which the following is a description.

My invention belongs to that general class of devices known as trolley poles, and relates particularly to a shock absorbing device applicable for use on the pole for carrying the trolley harp and trolley wheel or other trolley contact device or the equivalent of the harp and wheel. The invention has among its objects the production of a device of the kind described that is simple, convenient, durable, reliable, compact, efficient and satisfactory. It has particularly as an object the production of a device for holding the trolley wheel or other contact member in proper contact with the trolley wire at all times, preventing the wheel or contact device from jumping from the trolley wire. The invention has particularly among its objects the production of a trolley pole device of the kind described that will prove economical and desirable for the user by reducing (1) the ordinary repairs heretofore constantly necessary on the overhead wires and supports therefor; (2) arcing on the wheel and wire; (3) noise; (4) wear on the wheel and overhead conductor or trolley wire; (5) damage by dewirement; (6) liability for injury caused by damaged equipment; (7) loss of power; (8) crystallization; and (9) renewal of the incandescent lamps for lighting purposes. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts, Figure 1 is a view in elevation and partly in section of a portion of a trolley pole and harp with my device applied thereto;

Fig. 2 is a sectional view taken substantially on line 2—2 of Fig. 1;

Fig. 3 is a sectional view taken substantially on line 3—3 of Fig. 1; and

Fig. 4 is a sectional view taken substantially on line 4—4 of Fig. 1.

Referring to the drawings, it may be mentioned that my device is intended to be ordinarily located at the upper or free end of the trolley pole for carrying the trolley wheel and harp, or such other trolley wire contact device as may be desired, the same being substantially a real universal joint as well as a substantially perfect shock absorber. In Fig. 1, I have shown the upper end of the trolley pole 1, the harp 2 as it is commonly known, and trolley wheel or contact device 3, my invention consisting of suitable means or mechanism for securing the trolley harp and wheel at the end of the pole and carrying the same thereat.

In my improved construction, 1 represents a suitable part formed with a socket 5 arranged to receive the end of the trolley pole, which, if desired, may be slotted at one side as at 6 so as to permit a slight yielding in positioning the same on the pole, thereby affording a tight fit. The socket and pole may be secured together by any suitable means should the same be preferred. The member 4 is preferably formed with a recess and internally threaded as at 7 for engagement with a coöperating member 8, which may be locked against accidental withdrawal by a set screw 9 or equivalent means for the purpose. The member 8 is preferably provided with a flange 8', as shown, so as to form a recess at the top face, and is provided with a slot 10 through the same, the slot being preferably rectangular, as most clearly shown in Fig. 4. I also provide a part 11 having an extending portion 13 arranged to seat in a recess or socket in the end part 3, it being understood that parts 3 and 11 may be connected together in any suitable manner and such additional securing means provided as may be desired. Part 11 is also provided with a part 14 similar to the part 8, which is formed for threaded engagement with the part 11 and may be locked in place by a set screw 15 or the equivalent. Part 14 also is provided with a flange 14' corresponding with the flange 8' in part 8. The part 14 is constructed with a slot or rectangular opening 17 corresponding to the opening 10 in the part 8.

Arranged between the parts 8 and 14 is a resilient part 12 which is preferably of rubber or other yieldable or elastic material, the same being of a size and shape to tightly fit the parts 8 and 14 and space them substantially as shown in Fig. 1. The parts are secured together by a bolt, the shank part 18 extending through an opening 21 in the body part 12 and through the slots 10 and 17. There are preferably provided washers or the equivalent 16 on the bolt member 18 which bear against the top face of the members 8 and 14. The member 18, which is preferably rectangular in shape at the shank or center, as most clearly shown in Fig. 3, is preferably formed with threaded ends 19 and 20 similar to any bolt and engages with nuts 22 and 23 or the equivalent. If desired, one of the nuts may be formed integral on the bolt end as a head. The nuts shown are of the castellated type and locked in place by cotter pins 24 or the equivalent in the well known manner. The desired tension may be put on the bolt by screwing up the nut or nuts, thereby slightly compressing the resilient or elastic body 12 or its equivalent, which, as before mentioned, may be of rubber or the like. It may be mentioned that the slots or openings 10 and 17 are preferably made of a size to substantially closely fit the squared shank portion of the bolt member 18, and that the members 8 and 14 are relatively arranged so that the openings extend transversely as most clearly shown in Fig. 2, in which the opening 10 in the part 8 is shown in dotted lines. When so constructed the parts may be flexed in any direction, one or both parts 8 or 14 coöperating with the shank 18 permitting the flexing. When the parts are flexed, however, the resilient or elastic body 12 is compressed, the same tending to bring the parts back to normal position as soon as the cause of the flexing is removed. With this construction the device provides efficient electrical contacts, as the current flowing down from the wheel and harp passes into part 14, thence through the washer 16 and bolt, the bolt also having close contact with the sides of the slot 17, thence into part 8 in a similar manner, and through part 4 into the pole 1, and thence to the electrical apparatus.

In operation, assuming that the trolley harp is connected to the device as shown, the mechanism forms a flexible connection between the pole and harp in such a manner that the trolley harp, or that is the extreme end of the pole, may be swung vertically in a plane parallel to the line of advance of the pole and may also be swung laterally in a direction at right angles to the line of advance of the pole, or to any intermediate point or position. The flexible connection serves to uphold the upper end or trolley harp and wheel of the trolley pole so that the contact between the wheel and trolley wire is sufficient to prevent arcing at the point of contact between the wheel and wire. The parts may be easily removed from the pole and harp when necessary to replace the same for any reason. One important advantage of the construction is that the stock devices now in use need not be discarded and thrown away, but the harp or other contact device is merely removed at the upper end of the pole and my device arranged to connect the two, it being understood that a portion of the pole may be cut off, if necessary or desired, so as not to increase the length of the pole. Extensive tests have shown that with this device, arcing of the wheel and wire is very substantially reduced, as is also wear on the wheel and wire. Where the device is not employed, the trolley wheel causes considerable noise, giving discomfort to passengers and others, this particularly being the case on high speed interurban cars or trains equipped with trolley poles and running on an overhead system. With the present device the noise is reduced, and very largely eliminated, at least eliminated to an extent where it will not cause discomfort. It has also been found that the dewirement of the trolley wheel is considerably reduced, this in many cases preventing damage to the overhead wire and support. By preventing dewirement, and perhaps tearing loose of the overhead wire or supports, or tearing off the trolley from the car, the chance for damage to passengers, pedestrians or others is reduced; consequently accidents of this kind are not so common, and therefore liability for the same is reduced. Not the least of all of this is that loss of power compared with the ordinary construction has been reduced, so that the device is efficient and desirable for this reason alone.

In the construction ordinarily used heretofore, where the trolley harp is secured directly to the pole without a flexible connection, the trolley pole frequently bends when in use, and needs to be straightened or the same crystallizes, particularly when repeatedly bent and straightened, and the pole breaks. This frequently takes place in merely running under normal conditions, dewiring and striking of the cross wires, etc., not being considered. In the case where a trolley pole is provided with a contact of any suitable type fixed rigidly or practically so at the end of the pole, the parts all having some weight, in case of the pole striking a cross wire when dewired, the forward momentum of the contact device at the free end of the pole tends to bend the pole at substantially the point that it strikes the cross wire, and in some cases causes the pole to be broken, particularly after the pole has been bent and straightened several times. Cases have been known where the trolley harp or contact device has often been broken off and thrown with such force as to cast the same through the top of the car. Frequently not only is the pole bent or broken, but the cross wire, and perhaps the contact wire, is broken and falls to the ground. My device being exceptionally flexible, acts as a shock absorber and breaks the force of the blow of the pole, which is increased by the momentum of the trolley harp and wheel, so that bending of the pole from this cause is practically eliminated, and at least greatly reduced. By turning the nuts 22 or 23, one or both, or only one if but one is employed, the flexibility of the device may be modified and the same made suitable for the requirements or preference of any individual railroad. It may be noted that experience has proved that the saving in lamps alone would warrant the use of the device, for where in one instance one tungsten lamp per day per car, making thirty per month, were required for renewals, with my device applied one lamp per month was sufficient. This in itself makes the device economical, as the equipment will pay for itself in an exceedingly short time.

In the specification and claims, I have specified the device as a trolley harp carrier, and refer to the trolley wheel or trolley harp, but inasmuch as it is obvious that the device would operate the same or substantially so for any equivalent for the trolley wheel or harp, I wish to be understood in specifying a trolley harp and trolley wheel, and similar terms, as including any other type of contact device arranged to roll, slide or otherwise coöperate with the trolley wire, and take current therefrom or thereto.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a trolley pole attachment of the kind described and in combination, a plurality of coöperating members in direct electrical contact with one another, a coöperating body part of yieldable material arranged between the said members and means for connecting said members together.

2. In a trolley pole of the kind described and in combination, a plurality of coöperating members in direct electrical contact with one another, a coöperating body part of yieldable material arranged between the said members, and adjustable means for connecting said members together.

3. In a trolley pole of the kind described and in combination, a plurality of coöperating members in direct electrical contact with one another, a body of elastic material arranged between the said members, and means for securing said members and body together.

4. In a device of the kind described and in combination, a trolley pole, a trolley wire contact device, and means for securing said pole and device together comprising a part arranged to be attached to the pole and a coöperating part arranged to be attached to the contact device, a cushion of elastic material arranged between said parts, and means for securing said parts together.

5. In a device of the kind described and in combination, a trolley pole, a trolley wire contact device, and means for adjustably securing said pole and device together comprising a part arranged to be attached to the pole and a part arranged to be attached to the contact device, a cushion of elastic material arranged between said parts and means for adjustably securing said parts together.

6. In a device of the kind described and in combination, a trolley-pole, a trolley-wire contact device, and means for securing said pole and device together comprising a part arranged to be attached to the pole and a part arranged to be attached to the contact device, a cushion of elastic material arranged between said parts and means for securing said parts together comprising a bolt extending through said cushioning member and operatively connected with said parts.

7. In a device of the kind described and in combination, a trolley-pole, a trolley-wire contact device, and means for adjustably securing said pole and device together comprising a part arranged to be attached to the pole and a part arranged to be attached to the contact device, a cushion of elastic material arranged between said parts and means for adjustably securing said parts together comprising a bolt extending through said cushioning member and operatively connected with said parts.

8. In a device of the kind described and in combination, two spaced coöperating members, in direct electrical contact with one another, a block of elastic material arranged in the space between said members, and a bolt extended through said block and connecting said members.

9. In a device of the kind described and in combination, two spaced coöperating members in direct electrical contact with one another, a block of elastic material arranged in the space between said members, and a bolt extended through said block and adjustably connected to said members.

10. In a trolley-pole attachment of the kind described and in combination, a part constructed for attachment to the pole and having a plate at its end provided with an elongated slot at the center and with a flange about the edge and a similarly formed part arranged for attachment to the contact device, said second part arranged with its slot extending transversely of the slot of the other part, a cushioning member of elastic material arranged between said plates and seated within the confines of the flanges thereon, a bolt extending through said slots and means at the ends of said bolt for engaging said plates.

11. In a trolley-pole attachment of the kind described and in combination, a part constructed for attachment to the pole and having a transverse plate portion at its end provided with an elongated slot at the center and with a flange about the edge and a similarly formed coöperating part arranged for attachment to the contact device, said second part arranged with its slot extending transversely of the slot of the other part, a rubber cushioning member arranged between said plates and seated within the flanges thereon, a squared bolt extending through said slots and means at the ends of said bolt for engaging said plates.

12. In a device of the kind described and in combination two substantially similarly formed chambered parts provided with plates at their adjacent ends having openings therethrough, a bolt extending through said openings and provided with means at its ends for engaging said plates at the inner sides thereof, and a yieldable body arranged on said bolt between said plates.

13. In a device of the kind described and in combination, two substantially similarly formed chambered parts provided with plates at their adjacent ends having openings therethrough, a square bolt extending through said openings and provided with means at its ends for engaging said plates at the inner sides thereof, and an elastic body arranged on said bolt between said plates.

14. In a device of the kind described and in combination, two substantially similarly formed chambered parts provided with plates at their adjacent ends having elongated openings therethrough, a bolt extending through said openings and provided with means at its ends for engaging said plates at the inner sides thereof, said parts constructed to engage the bolt and be non-rotatable therein, and a rubber body arranged on said bolt between said plates.

15. In a trolley-pole attachment of the kind described and in combination, a plurality of coöperating members, a coöperating body part of yieldable material arranged between said members and means for connecting said members together, whereby they are relatively non-rotatable, but may move laterally in a pair of mutually transverse planes.

16. In a trolley-pole attachment of the kind described and in combination, a part constructed for attachment to a pole and having a transverse elongated slot at its end, a second part arranged for attachment to a contact device and being similarly formed, having an elongated slot at its end and adapted to be attached to said first mentioned part so that the slots are arranged transversely of one another, a cushioning member between said slotted parts at their slotted ends, and means extending through said slots for slidably and non-rotatably securing said parts together.

17. In a trolley-pole attachment of the kind described and in combination, a part arranged for attachment to a pole and having a transverse elongated slot at its end, a second part similarly formed, and arranged for attachment to a contact device, said second part having an elongated slot at its end and adapted to be attached to said first mentioned part so that the slots are arranged transversely of one another, a cushioning member between said parts at their slotted ends, a bolt having a non-circular shank extending through said slots for slidably and non-rotatably securing said parts together, and means at the end of said bolt to retain it in place.

18. In a trolley-pole attachment of the kind described and in combination, a part constructed for attachment to a pole, and having a transverse portion at its end provided with an elongated recess therein, a similarly formed coöperating part arranged for attachment to a contact device, said last named part arranged with a slot extending transversely of said first mentioned slot, a rubber cushion between the parts at their transverse portions, a square bolt extending through said slots, and means at the end of said bolt to prevent its disengagement.

In testimony whereof, I have hereunto signed my name in the presence to two subscribing witnesses.

CHARLES J. DORRANCE.

Witnesses:
Roy W. Hill,
Bertha Hartmann.